Feb. 17, 1942.  J. T. KING  2,273,578
HOSE CLAMP
Filed April 3, 1941
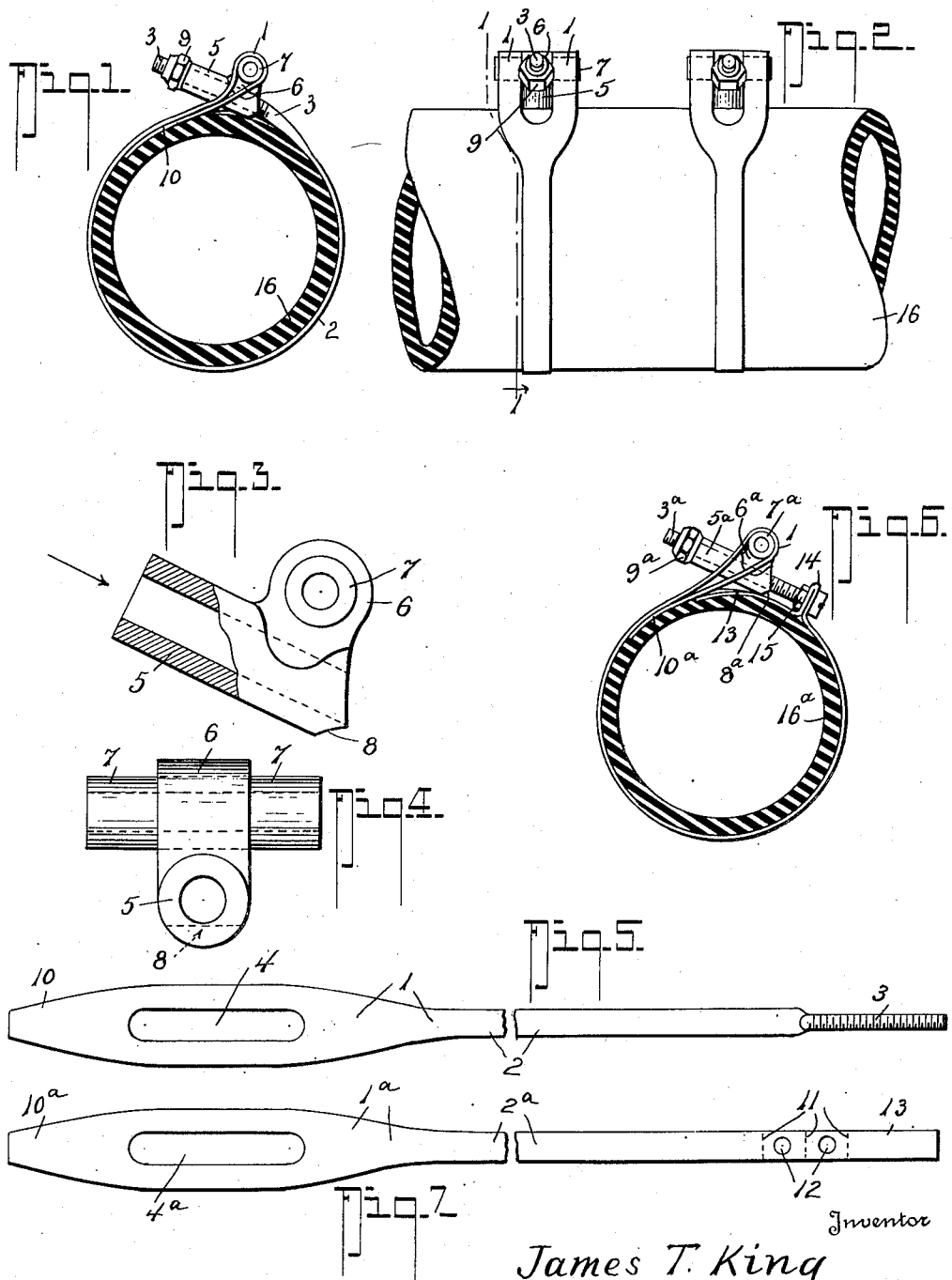
Inventor
*James T. King*
By *Albert E. Dieterich*
Attorney Patented Feb. 17, 1942

2,273,578

UNITED STATES PATENT OFFICE 2,273,578

HOSE CLAMP

James T. King, Burbank, Calif.

Application April 3, 1941, Serial No. 386,718

6 Claims. (Cl. 24—19)

My invention relates to the art of hose clamps and it particularly has for its objects to provide a clamp which is light in weight, possesses great strength, is made of such materials and is so constructed as to meet all standards of the S. A. E., a clamp which can be assembled on the hose after the hose is in place, a clamp that does not have to be pre-loaded to give the necessary tension to secure the flexible rubber hose connection from leaks of fuels under high pressures, a clamp which will stay tensioned under the application of external or internal heat, a clamp that is rust and weather proof and is specifically adapted for installation on aircraft, marine engines, and a clamp that can be safely used after removal from the original installation.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawing, in which:

Fig. 1 is a cross section on approximately the line 1—1 in Fig. 2.

Fig. 2 is a side elevation of a portion of a hose with two clamps in place.

Fig. 3 is an enlarged detail elevation and part section of the bolt guide and trunnion block.

Fig. 4 is an elevation of the same, looking in the direction of the arrow in Fig. 3.

Fig. 5 is a plan view of the flexible steel band shown in Figs. 1 and 2.

Fig. 6 is a view similar to Fig. 1 of a modification.

Fig. 7 is a view similar to Fig. 5 of the band shown in Fig. 6.

In the drawing like numbers of reference indicate like parts in all figures. A band of steel (preferably rustless sheet spring steel) is provided to encircle the flexible hose 16. This band comprises a short wide portion 1 and a long narrow portion 2, extending in one direction from the portion 1 and having brazed or welded to its end a screw 3. The wide portion 1 has a slot 4 which is designed to receive the tube 5 and lug 6 of the bolt guide and trunnion block. This block is compressed of a piece of "SS" tubing 5 (preferably rustless tubing) to which is welded or brazed a lug 6 to which is brazed or welded another piece of tubing to form trunnions 7 around which the band part 1, adjacent the slot 4, is bent (see Fig. 1). The rear end of the tubing 5 is preferably beveled off to provide a flat surface 8.

A nut 9 is threaded on the bolt 3 after the parts have been assembled on the hose 16, to apply the required tension and draw the clamp tightly in place. In assembling the clamp on the hose 16 body portion 1 of the band is looped around the trunnions 7 with the tubing 5 projecting through the slot 4; the band portion 2 is passed around the hose with the end 10 of the band on the under side and the bolt 3 is passed through tubing 5, after which the nut 9 is applied and tightened up.

Instead of welding or brazing a bolt 3 to the band, the band may be provided with eyes 12 so that when bent on the dotted lines 11 and folded back upon itself a lug 14 may be provided (Figs. 6 and 7). A headed bolt 3ª is then passed through the eyes 12 and secured to the lug 14 by a nut 15.

In the embodiment of Figs. 6 and 7 the band and block are assembled as before; the band is passed around the hose 16ª and bolt 3ª passed through tubing 5ª with the end extension 13 of the band lying beneath the beveled end 8ª of the tube 5ª. Nut 9ª is then tightened as before In Figs. 6 and 7 those parts which correspond in structure and function to like parts in Figs. 1 to 5 bear the same reference number plus the index letter a, so a repetition of the description thereof is thought to be unnecessary.

By allowing sufficient take-up in the design of the clamp it will eliminate the need to stock many various sized clamps as is now the practice with present approved hose clamps. The extremely limited take-up of other hose clamps now requires a specifically dimensioned hose clamp to fit each size of rubber hose, which increase, for diameter measurements, in one-eighth of an inch increments.

The construction shown and described herein is particularly adapted to use on supercharged aircraft engines where increased fuel and oil pressures require greater reliability and security for all accessories now being used.

From the foregoing description, taken in connection with the accompanying drawing, it is thought that the construction, operation and advantages of the invention will be clear to those skilled in the art to which it relates.

What I claim is:

1. In a hose clamp, a flexible sheet metal band having a slot near one end and a bolt at the other end, a bolt guide and trunnion block having a bolt guide portion which is designed to project through said slot when the band and block are assembled with the band at the sides of the slot looped around the trunnions of the block, said bolt projecting through the bolt guide of the block when the clamp is assembled on a hose, and a nut on the bolt for the application of clamping tension.

2. In a hose clamp, a flexible sheet metal band having a slot near one end and a bolt at the other end, a bolt guide and trunnion block having a bolt guide portion which is designed to project through said slot when the band and block are assembled with the band at the sides of the slot looped around the trunnions of the block, said bolt projecting through the bolt guide of the block when the clamp is assembled on a hose, a nut on the bolt for the application of clamping tension, said block comprising a piece of tubing, a lug projecting from one side of said tubing, and a second tubing carried by said lug and projecting to each side of the lug to constitute trunnions, the axis of the second tubing lying transversely of that of the first mentioned tubing.

3. In a hose clamp, a flexible sheet metal band having a slot near one end, a bolt guide and trunnion block having a bolt guide portion which is designed to project through said slot when the band and block are assembled with the band at the sides of the slot looped around the trunnions of the block, said band including a portion bent back on itself to constitute a lug, the band lug being apertured, a bolt secured to said band lug and designed to project through the bolt guide of said block when the clamp is assembled on a flexible hose, and a tension nut on said bolt to engage said bolt guide.

4. In a hose clamp, a flexible sheet metal band having a slot near one end, a bolt guide and trunnion block having a bolt guide portion which is designed to project through said slot when the band and block are assembled with the band at the sides of the slot looped around the trunnions of the block, said band including a portion bent back on itself to constitute a lug, the band lug having an aperture, a bolt secured to said band lug and designed to project through the bolt guide of said block when the clamp is assembled on a flexible hose, and a tension nut on said bolt to engage said bolt guide, said band having a portion extending beyond the band lug when the clamp has been assembled on the hose.

5. A flexible hose clamp comprising a flexible sheet metal band having a slot near one end, a bolt at the other end of the band, a combined bolt guide and trunnion member which includes trunnions and an elongated bolt guide, the latter being designed to project a substantial distance through said slot when the band and block are assembled with the band at the sides of the slot looped around the trunnions of the block, said bolt projecting through said bolt guide when the clamp is assembled on a hose, and a nut on the bolt for the application of clamping tension.

6. A flexible hose clamp comprising a flexible sheet metal band having a slot near one end, a bolt at the other end of the band, a combined bolt guide and trunnion member which includes trunnions and an elongated bolt guide, the latter being designed to project a substantial distance through said slot when the band and block are assembled with the band at the sides of the slot looped around the trunnions of the block, said bolt projecting through said bolt guide when the clamp is assembled on a hose, and a nut on the bolt for the application of clamping tension, said bolt guide lying between the trunnions and the hose, by virtue of which said bolt guide will lie adjacent the hose while the trunnions will lie spaced from the hose when the clamp is in use.

JAMES T. KING.